United States Patent [19]  [11] 3,867,543
Kohn  [45] Feb. 18, 1975

[54] INSECT CONTROL METHODS EMPLOYING CERTAIN SUBSTITUTED BENZOATES

[75] Inventor: Gustave K. Kohn, Berkeley, Calif.

[73] Assignee: Chevron Research Company, San Francisco, Calif.

[22] Filed: Aug. 16, 1972

[21] Appl. No.: 281,078

[52] U.S. Cl. ............... 424/301, 424/262, 424/269, 424/270, 424/272, 424/273, 424/275, 424/282, 424/285, 424/308, 424/DIG. 12, 424/263, 424/274, 424/267, 260/297 R, 260/302 R, 260/306.7, 260/309, 260/310 R, 260/332.3 R, 260/345.8, 260/347.2, 260/455 R, 260/473 R, 260/326.5 S

[51] Int. Cl. .......................... A01n 9/12, A01n 9/24

[58] Field of Search ............. 424/301, 308, DIG. 12

[56] References Cited
UNITED STATES PATENTS 3,136,800   6/1964   Grisley ........................... 260/30.8
3,557,194   1/1971   Fuchsman et al .................. 424/301
3,657,309   4/1972   Dexter et al ...................... 260/455
3,657,322   4/1972   Dexter et al ...................... 260/473

OTHER PUBLICATIONS

Borkovec, A., Insect Chemosterilants, Vol. VII (1966), p. 61–63.

Gomper et al., Liebigs Annalin, Bd. 684, 37 (1965).

*Primary Examiner*—Vincent D. Turner
*Attorney, Agent, or Firm*—G. F. Magdeburger; John Stoner, Jr.; Raymond Owyang

[57] ABSTRACT

3,5-Dialkyl-4-hydroxybenzoates, 3,5-dialkyl-4-hydroxythionobenzoates, 3,5-dialkyl-4-hydroxythiolobenzoates and 3,5-dialkyl-4-hydroxydithiobenzoates have morphogenetic hormonal mimetic activity on insects.

14 Claims, No Drawings

3,867,543

INSECT CONTROL METHODS EMPLOYING CERTAIN SUBSTITUTED BENZOATES

BACKGROUND OF THE INVENTION

1. Field of the Invention

The present invention is concerned with insecticidal compounds which have morphogenetic hormonal mimetic activity. Compounds having morphogentic hormonal mimetic activity exert a disrupting influence upon the normal development of insects. These compounds interfere with the normal metamorphosis of the pest insects and result in the formation of individual insects of the treated species which develop abnormally and are nonviable or sterile. This ultimately leads, indirectly at least, to the destruction of the insect population.

2. Description of the Prior Art

*Chemical and Engineering News*, Nov. 29, 1971, pages 9–10, discloses the use of 2,6-di-t-butyl-4($\alpha,\alpha$-dimethylbenzyl)phenol as a mosquito larvicide.

Copending application U.S. Ser. No. 199,034 of B. R. Kennedy and L. De Vries, filed Nov. 15, 1971, now U.S. Pat. No. 3,778,370, common assignee, and Gomper, Schmidt and Kutter, *Liebigs Annalin*, Bd 684, 37 (1965), disclose some of the dithiobenzoates used in the method of the invention.

SUMMARY OF THE INVENTION

It has now been found that esters of 3,5-di(branched alkyl)-4-hydroxybenzoic acids, 3,5-di(branched alkyl)-4-hydroxythionobenzoic acids, 3,5-di-(branched alkyl)-4-hydroxythiolobenzoic acids and 3,5-di-(branched alkyl)-4-hydroxydithiobenzoic acids are effective for the control of insects when applied in insecticidally effective amounts. The compounds of the present invention are particularly effective against mosquitos. Although mosquito larvae treated with the compounds develop normally through the larval stage, metamorphosis is blocked in the pupal stage, and the insect dies.

DESCRIPTION OF THE INVENTION

The Benzoic Esters

The benzoates, thiolobenzoates, thionobenzoates, and dithiobenzoates are represented by the formula (I)

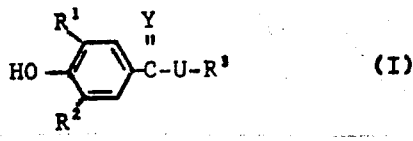

wherein Y is oxygen or sulfur; U is oxygen or sulfur; $R^1$ and $R^2$ are branched alkyl groups of 3 to 6 carbon atoms attached to the aromatic ring through a secondary or tertiary carbon atom; $R^3$ is alkyl of 1 to 6 carbon atoms, cycloalkyl of 3 to 10 carbon atoms, 2-alkenyl of 3 to 6 carbon atoms, 2-alkynyl of 3 to 6 carbon atoms, alkoxymethyl of 2 to 6 carbon atoms, alkylthiomethyl of 2 to 6 carbon atoms, benzyl, benzyl substituted on the aromatic ring with one to two substituents, preferably one, selected from alkyl of 1 to 4 carbon atoms, alkoxy of 1 to 4 carbon atoms, fluorine, chlorine, bromine and alkylenedioxy of 1 to 4 carbon atoms, or alkyl of 1 to 4 carbon atoms (preferably methyl) substituted with a heterocyclic group having 1 to 2 rings from 3–10 carbon atoms and 1 to 3 hetero atoms (e.g., O, S and N).

Representative branched alkyl groups which $R^1$ and $R^2$ may represent include s-propyl, s-butyl, t-butyl, t-amyl, s-hexyl, etc. $R^1$ and $R^2$ may be the same or different branched alkyl groups. Preferred $R^1$ and $R^2$ groups are attached to the aromatic ring through a secondary carbon atom (i.e., a carbon atom substituted with two alkyl groups) or a tertiary carbon atom (i.e., a carbon atom substituted with three alkyl groups).

Suitable alkyl $R^3$ groups include methyl, ethyl, n-propyl, isopropyl, n-butyl, t-butyl, n-pentyl, isohexyl, etc. Preferred alkyl $R^3$ groups are tertiary alkyl groups of 4 to 6 carbon atoms, e.g., t-butyl, t-amyl, etc. Suitable cycloalkyl groups include cyclopropyl, cyclopropylmethyl, cyclobutyl, cyclopentyl, 1-cyclopentylethyl, cyclohexyl, cyclohexylmethyl, 2-cyclohexylethyl, cycloheptyl, cyclooctyl etc. Preferred cycloalkyl groups are those having 5 to 8 carbon atoms. Suitable 2-alkenyl $R^3$ groups include allyl, 2-butenyl, 2-hexenyl etc. Suitable 2-alkynyl $R^3$ groups include propargyl, 2-butynyl, 2-pentynyl, etc. Suitable alkoxymethyl $R^3$ groups include methoxymethyl, ethoxymethyl, isopropoxymethyl, etc. Suitable alkylthiomethyl $R^3$ groups include methylthiomethyl, ethylthiomethyl, n-propylthiomethyl, etc. Suitable substituted benzyl $R^3$ groups include 4-methylbenzyl, 4-ethylbenzyl, 2,4-dimethylbenzyl, 3,5-diethylbenzyl, 3-t-butylbenzyl, 4-methoxybenzyl, 3,5-diethoxybenzyl, 2-fluorobenzyl, 3-fluorobenzyl, 4-fluorobenzyl, 2,4-difluorobenzyl, 4-chlorobenzyl, 2,4-dichlorobenzyl, 4-bromobenzyl, 3,4-methylenedioxybenzyl, 2,3-ethylenedioxybenzyl, 2-fluoro-4-methylbenzyl, 3-chloro-4-methoxybenzyl, etc. Substituted $R^3$ benzyl groups are preferably substituted in the meta or para position. Suitable heterocyclic-substituted alkyl $R^3$ groups include 2-thiophenemethyl, 3-thiophenemethyl, 2-(2-furanyl)ethyl, 3-furanylmethyl, 2-pyranylmethyl, 3-(3-pyranyl)propyl, 4-(2-pyranyl)butyl, 2-pyridylmethyl, 4-pyridylmethyl, 2-pyrrolylmethyl, 3-pyrrolylmethyl, 2-piperidylmethyl, 3-piperidylmethyl, 2-pyrrolinylmethyl, 2-imidazolylmethyl, 5-imidazolidinylmethyl, 2-pyrazolylmethyl, 2-thiazolylmethyl, 5-thiazolidinylmethyl, etc.

Illustrative thiolobenzoates (Y is oxygen and U is sulfur) of formula I include methyl 3,5-di-s-propyl-4-hydroxythiolobenzoate, ethyl, 3,5-s-propyl-6-t-butyl-4-hydroxythiolobenzoate, t-butyl 3,5-di-t-butyl-4-hydroxythiolobenzoate, t-amyl 3,5-di-t-butyl-4-hydroxythiolobenzoate, allyl 3,5-di-t-butyl-4-hydroxythiolobenzoate, 2-pentenyl 3,5-di-t-amyl-4-hydroxythiolobenzoate, propargyl 3,5-di-s-butyl-4-hydroxythiolobenzoate, 2-hexynyl 3,5-di-t-butyl-4-hydroxythiolobenzoate, methoxymethyl 3,5-di-t-amyl-4-hydroxythiolobenzoate, isopropylthiomethyl 3,5-di-t-butyl-4-hydroxythiolobenzoate, benzyl 3,5-di-t-butyl-4-hydroxythiolobenzoate, benzyl 3,5-t-amyl-6-t-butyl-4-hydroxythiolobenzoate, benzyl 3,5-di-t-amyl-4-hydroxythiolobenzoate, 3,5-dimethyl 3,5-di-t-butyl-4-hydroxythiolobenzoate, 3,5-dimethyl benzyl 3,5-di-t-butyl-4-hydroxythiolobenzoate, 4-fluorobenzyl 3,5-di-t-butyl-4-hydroxythiolobenzoate, 3,5-difluorobenzyl 3,5-di-t-butyl-4-hydroxythiolobenzoate, 4-chlorobenzyl 3,5-di-t-butyl-4-hydroxythiolobenzoate, 3-fluoro-4-chlorobenzyl 3,5-di-t-amyl-4-hydroxythiolobenzoate, 3-methyl-4-chlorobenzyl 3,5-di-t-butyl-4-hydroxythiolobenzoate, 3,4-methylenedioxybenzyl 3,5- di-s-propyl-4-hydroxythiolobenzoate, 3,4-methylenedioxybenzyl 3,5-di-t-butyl-4-hydroxythiolobenzoate, 2-(3-methylthiophene)methyl 3,5-di-t-butyl-4-hydroxythiolobenzoate, 2-(3-methylpyridyl)-methyl 3,5-di-t-butyl-4-hydroxythiolobenzoate, 2-(3-methylfuran-2-yl)ethyl 3,5-di-t-butyl-4-hydroxythiolobenzoate, 2-piperidylmethyl 3,5-di-t-butyl-4-hydroxythiolobenzoate, 2-pyranylmethyl 3,5-di-t-butyl-4-hydroxythiolobenzoate, 2-imidazolylmethyl 3,5-di-t-butyl-4-hydroxythiolobenzoate, 2-imidazolidinylmethyl 3,5-di-t-butyl-4-hydroxythiolobenzoate, 2-pyrrolylmethyl 3,5-di-t-butyl-4-hydroxythiolobenzoate, 2-pyrrolinylmethyl 3,5-di-t-butyl-4-hydroxythiolobenzoate, 2-pyrazolylmethyl 3,5-di-t-butyl-4-hydroxythiolobenzoate, 2-benzimidazolylmethyl 3,5-di-t-butyl-4-hydroxythiolobenzoate, 2-thiazolylmethyl 3,5-di-t-butyl-4-hydroxythiolobenzoate, 2-thiazolidinylmethyl 3,5-di-t-butyl-4-hydroxythiolobenzoate.

Illustrative dithiobenzoates (Y and U are sulfur) of formula I include propyl 3,5-di-t-butyl-4-hydroxythiolobenzoate, t-butyl 3,5-di-t-butyl-4-hydroxythiolobenzoate, cyclohexylmethyl 3,5-di-t-butyl-4-hydroxydithiolobenzoate, allyl 3,5-di-t-butyl-4-hydroxydithiobenzoate, propargyl 3,5-di-t-amyl-4-hydroxydithiobenzoate, ethoxymethyl 3,5-di-s-amyl-4-hydroxydithiobenzoate, ethylthiomethyl 3,5-di-t-butyl-4-hydroxydithiobenzoate, benzyl 3,5-di-t-butyl-4-hydroxydithiobenzoate, benzyl 3,5-di-t-amyl-4-hydroxydithiobenzoate, 4-t-butylbenzyl 3,5-di-t-butyl-4-hydroxydithiobenzoate, 2,4-difluorobenzyl 3,5-di-t-butyl-4-hydroxydithiobenzoate, 4-chlorobenzyl 3,5-di-t-butyl-4-hydroxydithiobenzoate, 3-chloro-4-bromobenzyl 3,5-di-t-butyl-4-hydroxydithiobenzoate, 3,4-methylenedioxybenzyl 3,5-di-t-butyl-4-hydroxydithiobenzoate, 2-thiophenemethyl 3,5-di-t-butyl-4-hydroxydithiobenzoate, 2-pyridyl 3,5-di-t-butyl-4-hydroxydithiobenzoate, 2-furanylmethyl 3,5-di-t-butyl-4-hydroxydithiobenzoate, 2-piperidylmethyl 3,5-di-t-butyl-4-hydroxydithiobenzoate, 2-pyranylmethyl 3,5-di-t-butyl-4-hydroxydithiobenzoate, 2-imidazolylmethyl 3,5-di-t-butyl-4-hydroxydithiobenzoate, 2-imidazolidinylmethyl 3,5-di-t-butyl-4-hydroxydithiobenzoate, 2-pyrrolylmethyl 3,5-di-t-butyl-4-hydroxydithiobenzoate, 2-pyrrolinylmethyl 3,5-di-t-butyl-4-hydroxydithiobenzoate, 2-pyrazolylmethyl 3,5-di-t-butyl-4-hydroxydithiobenzoate, 2-thiazolylmethyl 3,5-di-t-butyl-4-hydroxydithiobenzoate, 2-thiazolidinylmethyl 3,5-di-t-butyl-4-hydroxydithiobenzoate.

Illustrative benzoates of formula I (Y and U are oxygen) include methyl 3,5-di-t-butyl-4-hydroxybenzoate, ethyl 3,5-s-propyl-6-t-butyl-4-hydroxybenzoate, t-butyl 3,5-di-t-butyl-4-hydroxybenzoate, t-amyl 3,5-di-t-butyl-4-hydroxybenzoate, allyl 3,5-di-t-butyl-4-hydroxybenzoate, 2-pentenyl 3,5-di-t-amyl-4-hydroxybenzoate, propargyl 3,5-di-s-butyl-4-hydroxybenzoate, 2-hexynyl 3,5-di-t-butyl-4-hydroxybenzoate, methoxymethyl 3,5-di-t-amyl-4-hydroxybenzoate, isopropylthiomethyl 3,5-di-t-butyl-4-hydroxybenzoate, benzyl 3,5-di-t-butyl-4-hydroxybenzoate, benzyl 3,5-t-amyl-6-t-butyl-4-hydroxybenzoate, benzyl 3,5-di-t-amyl-4-hydroxybenzoate, 4-methylbenzyl 3,5-di-t-butyl-4-hydroxybenzoate, 3,5-dimethylbenzyl 3,5-di-t-butyl-4-hydroxybenzoate, 4-fluorobenzyl 3,5-di-t-butyl-4-hydroxybenzoate, 3,5-difluorobenzyl 3,5-di-t-butyl-4-hydroxybenzoate, 4-chlorobenzyl 3,5-di-5-butyl-4-hydroxybenzoate, 3-fluoro-4-chlorobenzyl 3,5-di-t-amyl-4-hydroxybenzoate, 3-methyl-4-chlorobenzyl 3,-5-di-s-butyl-4-hydroxybenzoate, 3,4-methylenedioxybenzyl 3,5-di-s-propyl-4-hydroxybenzoate, 3,4-methylenedioxybenzyl 3,5-di-t-butyl-4-hydroxybenzoate, 2-thiophenemethyl 3,5-di-t-butyl-4-hydroxybenzoate, 2-pyridyl 3,5-di-t-butyl-4-hydroxybenzoate, 2-furanylmethyl 3,5-di-t-butyl-4-hydroxybenzoate, 2-piperidylmethyl 3,5-di-t-butyl-4-hydroxybenzoate, 2-pyranylmethyl 3,5-di-t-butyl-4-hydroxybenzoate, 2-imidazolylmethyl 3,5-di-t-butyl-4-hydroxybenzoate, 2-imidazolidinylmethyl 3,5-di-t-butyl-4-hydroxybenzoate, 2-pyrrolylmethyl 3,5-di-t-butyl-4-hydroxybenzoate, 2-pyrrolinylmethyl 3,5-di-t-butyl-4-hydroxybenzoate, 2-pyrazolylmethyl 3,5-di-t-butyl-4-hydroxybenzoate, 2-thiazolylmethyl 3,5-di-t-butyl-4-hydroxybenzoate, 2-thiazolidinylmethyl 3,5-di-t-butyl-4-hydroxybenzoate.

The thiolobenzoates of formula (I) maay exist in their tautomeric form, i.e., as thionobenzoates (wherein Y is sulfur and U is oxygen). Such tautomers of the thiolobenzoates are suitably employed in the method of invention.

The dithiobenzoates of formula (I) are prepared by the reaction of a dithiobenzoate salt and an organic halide corresponding to the $R^3$ group as depicted in the following equation (1).

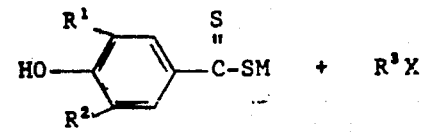

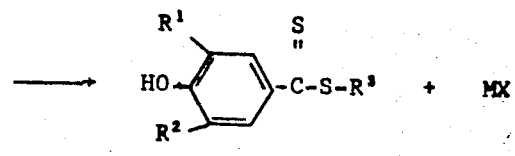

(1)

wherein $R^1$, $R^2$ and $R^3$ have the same significance as defined above, M is a metal cation, preferably an alkali metal cation, e.g., sodium or potassium, and X is a halogen, preferably chlorine or bromine.

The reaction depicted in equation 1 is conducted by conventional procedures. The molar ratio of dithiobenzoate salt to $R^3X$ is substantially equimolar. The reaction is conducted in inert solvents, preferably aprotic solvents having high dielectric constants, such as dimethoxyethane, dimethylsulfoxide, etc. Reaction temperatures suitably vary from 0°C to 150°C. The product is generally obtained by evaporating or distilling off the solvent after the reaction mixture has been washed with water to remove by-product salts. The product is then purified by recrystallization, chromatography, etc.

Dithiobenzoate salts of formula II are suitably prepared from the dithiobenzoic acid and an alkali metal hydroxide solution. Alternatively, dithiobenzoate salts are prepared directly from 3,5-di-(branched alkyl) phenols and carbon disulfide by known procedures, as disclosed for example, by Gomper, Schmidt and Kutter, *Liebigs Annalin* Bd 684, 37 (1965).

The thiolobenzoates of formula (I) are prepared by the reaction of a benzoyl halide and a mercaptan corresponding to the $R^3$ group in the presence of an acid acceptor as depicted in the following equation (2).

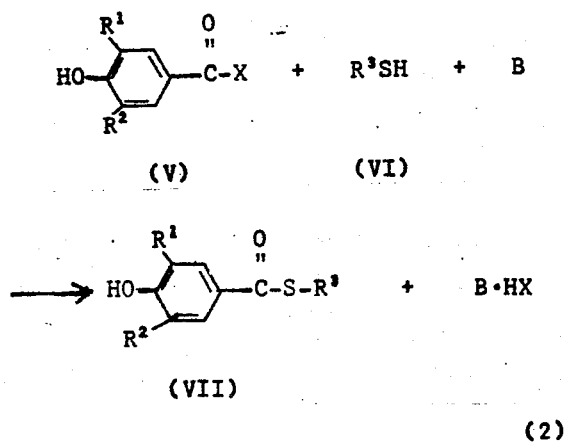

wherein $R^1$, $R^2$, $R^3$ and X have the same significance as defined above and B is an acid acceptor.

The reaction depicted in equation (2) is conducted by conventional procedures. Molar ratios of the reactants are substantially equimolar. Suitable acid acceptors include organic bases such as pyridine and trialkylamines, e.g., triethylamine. Inert solvents are generally employed. Reaction temperatures vary from 0°C. to 150°C. The product is isolated by conventional methods such as extraction, distillation, crystallization, etc.

The benzoates of formula (I) are prepared by the reaction of a benzoyl halide and an alcohol corresponding to the $R^3$ group in the presence of an acid and by the same conventional procedures employed for the preparation of the thiolobenzoates of formula (I).

Insect Control

The compounds of the present invention are useful as insecticides, particularly as morphogenetic hormonal mimetic insecticides; that is they inhibit the normal growth pattern (maturation) of certain insects thereby limiting reproduction of those insects.

In addition to mosquitos, the compounds of the invention have morphogenetic hormonal mimetic activity on insects such as houseflies (*Musca domestica L.*), yellow mealworm (*Tenelrio molitor*), cabbage looper (*Trichoplusia ni*) and kissing bug (*Rhodnius prolixus*).

The compounds are very potent and are used at extremely low concentrations. For example, compositions containing 100 ppm to 0.01 ppm, preferably from 5 ppm to 0.1 ppm, are effective for the control of insects. However, the effective concentration depends in part on the mode of application and the particular insect.

The compounds may be applied in either liquid or solid formulations to the pre-adult insects or their environment. For example, they may be sprayed or otherwise applied directly to plants or aqueous bodies so as to effect control of insects coming into contact therewith.

Formulations of the compounds of this invention will comprise a toxic amount of one or more of the compounds and a biologically inert carrier. Usually they will also contain a wetting agent. Solid carriers such as clay, talc, sawdust, alfalfa meal, and the like may be used in such formulations. Liquid diluents which may be used with these compounds include water and aromatic solvents. In addition these formulations may contain other compatible pesticides, fillers, stabilizers, attractants and the like.

The concentration of the active ingredient to be used with inert carriers, either solid or liquid carriers, will be dependent upon many factors, such as the particular compound which is used, the carrier in or upon which it is incorporated, the method and conditions of application, the insect species to be controlled, etc., the proper consideration of these factors being within the skill of those versed in the art. In general, the toxic ingredients of this invention will be effective in concentrations from about 0.0001 percent by weight to as high as 50 percent by weight or higher.

The compounds of the invention are particularly useful in combination with mosquito larvicidal petroleum oil dispersions. Petroleum oils suitable as mosquito larvicidal dispersions are known. Such hydrocarbon oils include mineral oils such as naphthenic base and paraffinic base lubricating oils, etc., as well as synthetic oils. Such hydrocarbon oils are nonphytotoxic and generally contain not more than a few percent aromatics. Particularly suitable hydrocarbon oils have boiling points above 350° to 400°F and viscosities of from about 33 to 200 SSU at 100°F.

The amount of the compound of the invention employed in petroleum oil generally ranges from 0.1 to 10 percent by weight based on weight of oil. The hydrocarbon oil dispersions containing the compounds of the invention are contacted with or applied to the surface of the aqueous bodies wherein mosquito control is desired by conventional methods.

The terms "insecticide" and "insect" as used herein refer to their broad and commonly understood usage rather than to those creatures which in the strict biological sense are classified as insects. Thus, the term "insect" is used not only to include small invertebrate animals belonging to the class Insecta but also to other related classes of arthropods whose members are segmented invertebrates having more or fewer than six legs, such as spiders, mites, ticks, centipedes, worms and the like.

EXAMPLE 1

Preparation of Benzyl 3,5-di-t-butyl-4-hydroxydithiobenzoate

A flask was charged with 0.3 mol of 2,6-di-t-butylphenol and 150 ml. of dimethylsulfoxide. To the flask maintained at 10°C was added dropwise an aqueous solution of 0.6 mol potassium hydroxide, followed by 0.3 mol carbon disulfide. The resulting reaction mixture was stirred at 10°C for 1 hour and then allowed to warm to about 25°C. Concentrated hydrochloric acid (0.3 mol) was then added slowly to the reaction mixture maintained at 0°C. Benzylbromide (0.3 mol) was then added and the reaction mixture heated at 50°C for 1 hour. The reaction mixture was cooled, diluted with 600 ml. ice water, and extracted with ether. The ether extracts were washed with water, dried over magnesium sulfate and evaporated to give the crude product. After recrystallization from hexane, the product melted at 110°-112°C. Elemental analysis on the product is tabulated in Table I. The product is believed to be novel.

EXAMPLE 2

Preparation of Allyl 3,5-di-t-butyl-4-hydroxydithiobenzoate

A 0.1 mol of sample of 2,6-di-t-butylphenol was added dropwise to a solution of 0.2 mol sodium hydride (57 percent in mineral oil) in 150 ml. dimethoxyethane under an atmosphere of nitrogen at about 25°C. After the addition was completed, the reaction mixture was stirred for one hour at 25°C. A 0.1 mol sample of carbon disulfide was then added and resulting reaction mixture stirred at about 25°C for 10 minutes. Concentrated hydrochloric acid (0.1 mol) was added slowly, followed by 0.1 mol allyl bromide in 50 ml. dimethoxyethane. The reaction mixture was then heated under reflux overnight (about 16 hours). The reaction mixture was poured into ice water and the crystalline product recovered by filtration. Recrystallization from ether/hexane gave the product which melted at 93°–95°C. Elemental analysis on the product is tabulated in Table I.

EXAMPLE 3

Preparation of t-butyl 3,5-di-t-butyl-4-hydroxythiolobenzoate

To a flask containing 0.05 mol 2,6-di-t-butyl-4-hydroxybenzoyl chloride (m.p. 96°–98°C) and 0.05 mol pyridine in 250 ml. dimethoxyethane was added slowly 0.05 mol t-butyl mercaptan. After the addition was completed, the reaction mixture was refluxed. The reaction mixture was then diluted with ice water, extracted with methylene dichloride and evaporated. The residue was chromatographed on silica gel (hexane/ether eluants) to give the product, m.p. 117°–120°C. Elemental analysis on the product is tabulated in Table I.

EXAMPLE 4

Preparation of Benzyl 3,5-di-t-butyl-4-hydroxybenzoate

To a flask containing 0.1 mol sodium 2,6-di-t-butyl-4-hydroxybenzoate in 200 dimethoxyethane was added dropwise 0.1 mol of benzyl chloride. The reaction mixture was refluxed. The reaction mixture was then diluted with ether, washed with water, dried over magnesium sulfate and evaporated to give the crude product. Recrystallization from hexane gave product which melted at 80°–83°C. Elemental analysis of the product is tabulated in Table I.

EXAMPLE 5

2-Thiophenemethyl 3,5-di-t-butyl-4-hydroxybenzoate

A solution of 0.1 mol 2,6-di-t-butyl-4-hydroxybenzoyl chloride, 0.1 mol 2-hydroxymethylthiophene, and 0.1 mol pyridine in 200 dimethoxyethane was refluxed for 1 hour. The reaction mixture was filtered to remove precipitated pyridine hydrochloride, poured onto ice, extracted with ether, dried over magnesium sulfate and evaporated under reduced pressure to give a yellow solid residue. The residue was recrystallized from hexane to give the product, m.p. 74°–78°C. Elemental analysis on the product is tabulated in Table I.

EXAMPLE 6

2-Thiophenemethyl 3,5-di-t-butyl-4-hydroxydithiobenzoate

A 0.1 mol 2,6-di-t-butylphenol was added dropwise to a solution of 0.2 mol sodium hydride (57 percent in mineral oil) in 150 ml of dimethoxyethane under an atmosphere of nitrogen at about 25°C. After the addition was completed, the reaction mixture was stirred for 1 hour at 25°C. A 0.1 mol sample of carbon disulfide was then added and the resulting reaction mixture stirred at about 25°C for 10 minutes. Concentrated hydrochloric acid (0.1 mol) was added slowly, followed by 0.1 mol 2-(chloromethyl)thiophene in 50 ml of dimethoxyethane. The reaction mixture was then heated under reflux overnight (about 16 hours). The reaction mixture was poured into ice water and the crystalline product recovered by filtration. Recrystallization from ether/hexane gave the product which melted at 104°–107°C. Elemental analysis on the product is tabulated in Table I.

TABLE I

| COMPOUND | MELTING POINT °C | ELEMENTAL ANALYSIS | | | |
|---|---|---|---|---|---|
| | | Sulfur, % wt. | | Halogen, % wt. | |
| | | Calc. | Found | Calc. | Found |
| 3,4-methylenedioxybenzyl 3,5-di-t-butyl-4-hydroxydithiobenzoate | 118 | 15.4 | 14.7 | — | — |
| benzyl 3,5-di-t-butyl-4-hydroxythiolobenzoate | 122–124 | 9.0 | 8.9 | — | — |
| benzyl 3,5-di-t-butyl-4-hydroxydithiobenzoate | 110–112 | 17.3 | 16.4 | — | — |
| benzyl 3,5-di-t-butyl-4-hydroxybenzoate | 80–83 | — | — | — | — |
| p-chlorobenzyl 3,5-di-t-butyl-4-hydroxydithiobenzoate | 107–109 | 16.2 | 15.7 | 8.9(Cl) | 8.7 |
| p-chlorobenzyl 3,5-di-t-butyl-4-hydroxythiolobenzoate | 117–120 | 8.2 | 8.4 | 9.1(Cl) | 9.0 |
| p-methoxybenzyl 3,5-di-t-butyl-4-hydroxydithiobenzoate | 122–125 | 15.9 | 15.6 | — | — |
| m-fluorobenzyl 3,5-di-t-butyl-4-hydroxydithiobenzoate | 90–93 | 16.4 | 16.3 | 4.9(F) | 5.0 |
| o-fluorobenzyl 3,5-di-t-butyl-4-hydroxydithiobenzoate | 124–127 | 16.4 | 16.2 | 4.9(F) | 5.0 |
| p-fluorobenzyl 3,5-di-t-butyl-4-hydroxydithiobenzoate | 94–96 | 16.4 | 16.3 | 4.9(F) | 5.0 |
| p-ethylbenzyl 3,5-di-t-butyl-4-hydroxydithiobenzoate | liquid | 16.0 | 15.7 | — | — |
| methyl 3,5-di-t-butyl-4-hydroxydithiobenzoate | 110–112 | 21.6 | 21.7 | — | — |
| methyl 3,5-di-t-butyl-4-hydroxythiolobenzoate | 138–140 | 11.4 | 11.6 | — | — |
| t-butyl 3,5-di-t-butyl-4-hydroxythiolobenzoate | 151–153 | 9.9 | 9.4 | — | — |
| allyl 3,5-di-t-butyl-4-hydroxydithiobenzoate | 93–95 | 19.9 | 19.5 | — | — |
| propargyl 3,5-di-t-butyl-4-hydroxydithiobenzoate | 110–113 | 20.0 | 19.5 | — | — |
| methoxymethyl 3,5-di-t-butyl-4-hydroxydithiobenzoate | 62–64 | 19.6 | 18.7 | — | — |
| methylthiomethyl 3,5-di-t-butyl-4-hydroxydithiobenzoate | 65–67 | 28.1 | 27.7 | — | — |
| 2-thiophenemethyl 3,5-di-t-butyl-4-hydroxybenzoate | 74–78 | 9.3 | 8.8 | — | — |
| 2-thiophenemethyl 3,5-di-t-butyl-4-hydroxydithiobenzoate | 104–107 | 25.4 | 23.2 | — | — |
| 2-thiophenemethyl 3,5-di-t-butyl-4-hydroxythiolobenzoate | 121–123 | 17.7 | 16.3 | — | — |
| 2-pyridinyl 3,5-di-t-butyl-4-hydroxythiolobenzoate | 138–140 | 9.35 | 9.52 | — | — |
| 2-thiazolinyl 3,5-di-t-butyl-4-hydroxythiolobenzoate | 158–160 | 18.25 | 18.01 | — | — |

Other compounds were prepared from appropriate starting materials using the procedures described in Examples 1-6. These compounds are tabulated in Table I.

EXAMPLE 7

Mosquito Control

The compounds of the present invention were tested as morphogenetic hormonal mimetic insecticides against the Yellow Fever mosquito larvae (*Aedes aegypti*) by the following procedures: Late fourth stage larvae of the mosquito are placed in a cup containing 30 ml. of deionized water containing a known amount of the test compound dissolved therein. About 20 larvae are used per test. The larvae are fed and allowed to pupate. The live pupae are kept until the adult mosquito emerges. A count is made at each step for mortality, i.e., larval pupal and adult mortality. The compound tested, the concentration and the mortality counts are tabulated in Table II.

EXAMPLE 8

Residual Life in Biologically Active Water

Groups of 5 cups of water containing mosquito larvae rearing food were treated with the same dosage of the test compound. One of the 5 cups was infested just prior to treatment with about 20 first and third stage Aedes aegypti larvae (representing non-synchronized mosquito populations). The remaining cups were infested with the same larvae at various intervals after treatment of the water with the test compound. Pupal mortality was observed up through adult emergence. The test compound, the compound dosage and pupal mortality are tabulated in Table III.

TABLE II

YELLOW FEVER MOSQUITO CONTROL

| COMPOUND | CONCENTRATION (ppm) | % MORTALITY | | | |
|---|---|---|---|---|---|
| | | Larvae | Pupae | Adult | Total |
| 3,4-methylenedioxybenzyl 3,5-di-t-butyl-4-hydroxydithiobenzoate | 1.7 | 0 | 75 | 0 | 75 |
| | 1 | 0 | 75 | 0 | 75 |
| benzyl 3,5-di-t-butyl-4-hydroxythiolobenzoate | 1 | 0 | 70 | 0 | 70 |
| | 0.3 | 0 | | | |
| | 0.3 | 80 | | | |
| | 0.1 | 0 | 55 | 0 | 55 |
| benzyl 3,5-di-t-butyl-4-hydroxydithiobenzoate | 1.7 | 10 | 70 | 0 | 80 |
| | 0 | 70 | 0 | 70 | |
| benzyl 3,5-di-t-butyl-4-hydroxybenzoate | 1.7 | 0 | 10 | 0 | 10 |
| p-chlorobenzyl 3,5-di-t-butyl-4-hydroxydithiobenzoate | 1.7 | 0 | 20 | 0 | 20 |
| p-chlorobenzyl 3,5-di-t-butyl-4-hydroxythiolobenzoate | 1.7 | 0 | 40 | 0 | 40 |
| p-methoxybenzyl 3,5-di-t-butyl-4-hydroxydithiobenzoate | 1.7 | 0 | 20 | 0 | 20 |
| m-fluorobenzyl 3,5-di-t-butyl-4-hydroxydithiobenzoate | 1.7 | 0 | 50 | 0 | 50 |
| o-fluorobenzyl 3,5-di-t-butyl-4-hydroxydithiobenzoate | 1.7 | 0 | 35 | 0 | 35 |
| p-fluorobenzyl 3,5-di-t-butyl-4-hydroxydithiobenzoate | 1.7 | 0 | 55 | 0 | 55 |
| p-ethylbenzyl 3,5-di-t-butyl-4-hydroxydithiobenzoate | 1.7 | 0 | 10 | 0 | 10 |
| methyl 3,5-di-t-butyl-4-hydroxydithiobenzoate | 1.7 | 0 | 50 | 0 | 50 |
| methyl 3,5-di-t-butyl-4-hydroxythiolobenzoate | 1.7 | 0 | 10 | 0 | 10 |
| t-butyl 3,5-di-t-butyl-4-hydroxythiolobenzoate | 1.7 | 0 | 100 | 0 | 100 |
| | 1 | 0 | 90 | 0 | 90 |
| | 0.3 | 0 | 65 | 0 | 65 |
| allyl 3,5-di-t-butyl-4-hydroxydithiobenzoate | 1.7 | 65 | 0 | 0 | 65 |
| | 1 | 0 | 55 | 0 | 55 |
| propargyl 3,5-di-t-butyl-4-hydroxydithiobenzoate | 1.7 | 0 | 70 | 0 | 70 |
| | 1 | 5 | 50 | 0 | 55 |
| methoxymethyl 3,5-di-t-butyl-4-hydroxydithiobenzoate | 1.7 | 0 | 15 | 0 | 15 |
| methylthiomethyl 3,5-di-t-butyl-4-hydroxydithiobenzoate | 1.7 | 0 | 30 | 0 | 30 |
| 2-thiophenemethyl 3,5-di-t-butyl-4-hydroxydithiobenzoate | 0.3 | 0 | 100 | 0 | 100 |
| | 0.1 | 0 | 75 | 0 | 75 |
| 2-thiophenemethyl 3,5-di-t-butyl-4-hydroxybenzoate | 1.7 | 0 | 75 | 0 | 75 |

TABLE III

| COMPOUND | CONCENTRATION (ppm) | DAYS POST-TREATMENT GIVING 100% PUPAE MORTALITY | |
|---|---|---|---|
| | | Pupae from third larvae | Pupae from first larvae |
| benzyl 3,5-di-t-butyl-4-hydroxydithiolobenzoate | 1 | 8 | 14 |
| | 0.3 | 4 | 9 |
| | 0.1 | 2 | — |
| benxyl 3,5-di-t-butyl-4-hydroxythiolobenzoate | 1.0 | 5 | 9 |
| | 0.3 | 5 | 6 |
| | 0.1 | 2 | — |

EXAMPLE 9

Fish Toxicity

Mosquito fish (*Carnbusia affinis*) were exposed to 10 ppm of benzyl 3,5-di-t-butylthiolobenzoate for two weeks. No fish kill was observed.

EXAMPLE 10

Mosquito Control with Petroleum Oil Formulations

A 1 percent by weight formulation of a variety of the benzoates of the invention was prepared with an oil composition having 96.1 percent by weight of a petroleum oil having an aromatic content of 8.4 percent by weight and a viscosity of 36.3 SSU at 100°F, 0.9 percent by weight of ethoxylated dodecyl phenol (molecular wt. 526 and 6 mols ethylene oxide per mol phenol) and 3 percent by weight of polyisobutenyl succinic anhydride (molecular wt. 950).

The oil formulations were tested for the control of *Aedes aegypti* larvae by applying a thin film of the oil formulation to a container containing 20 larvae, 170 ml of water and a small amount of larva-rearing food. A count is made after two days for larval and pupal mortality. The benzoate employed, the concentration and the results (average of two replicates) are tabulated in Table IV.

TABLE IV

| Benzoate Compound | | Oil Dosage gallon/acre | PPM Benzoate/ Part Water | % Mortality | | |
|---|---|---|---|---|---|---|
| | | | | Larvae | Pupae | Total |
| t-Butyl | 3,5-di-t-butyl-4-hydroxy-thiolobenzoate | 0.5 | 0.08 | 0 | 85 | 85 |
| | | 0.33 | 0.05 | 0 | 78 | 78 |
| Benzyl | 3,5-di-t-butyl-4-hydroxy-thiolobenzoate | 0.5 | 0.08 | 0 | 70 | 70 |
| | | 0.33 | 0.05 | 0 | 78 | 70 |
| Benzyl | 3,5-di-t-butyl-4-hydroxy-dithiobenzoate | 0.5 | 0.08 | 0 | 90 | 90 |
| | | 0.33 | 0.05 | 0 | 30 | 30 |
| None | | 0.5 | none | 10 | 0 | 10 |
| | | 0.33 | none | 10 | 2 | 12 |

EXAMPLE 11

Heterocyclic Benzoic Acid Esters

The $R^3$ group of formula (I) may also represent heterocyclic groups having 1 to 2 rings, 3 to 10 carbon atoms and 1 to 3 heteroatoms (e.g., O, S, and N). Suitable heterocyclic $R^3$ groups include 3-isoxazolyl, 5-isoxazolinyl, 2-thiazolyl, 2-thiazolinyl, 3-pyrazolyl, 2-imidazolyl, 2-pyrrolyl, 2-furanyl, 2-thiophene, 2-(7-methylbenzoxazolyl), 2-benzothioazolyl, 2-benzimidazolyl, 2-indolyl, 1-isoindolyl, 7-(2,2-dimethyl-2,3-dihydrobenzofuranyl), etc. Representative compounds of formula (I) having heterocyclic $R^3$ groups include 2-benzothiazolyl 3,5-di-t-butyl-4-hydroxythiolobenzoate, 2-benzimidazolyl 3,5-di-t-butyl-4-hydroxythiolobenzoate, 2-thiophene 3,5-di-t-butyl-4-hydroxydithiobenzoate, 7-(2,2-dimethyl-2,3-dihydrobenzofuranyl) 3,5-di-t-butyl-4-hydroxybenzoate, 7-(2,2-dimethyl-2,3-dihydrobenzofuranyl) 3,5-di-t-butyl-4-hydroxythiolobenzoate.

The compounds of formula (I) having heterocyclic $R^3$ groups are prepared by the procedures heretofore described. For example, 2-benzimidazolyl 3,5-di-t-butyl-4-hydroxythiolobenzoate is prepared by the reaction of 2,6-di-t-butyl-4-hydroxybenzoyl chloride and 2-mercaptobenzimidazolyl in the presence of an acid acceptor.

As will be evident to those skilled in the art, various modifications on this invention can be made or followed, in the light of the foregoing disclosure and discussion, without departing from the spirit or scope of the disclosure or from the scope of the following claims.

We claim:

1. A method for killing mosquitos which comprises contacting pre-adult mosquitos with a metamorphosis inhibiting amount of a compound represented by the formula

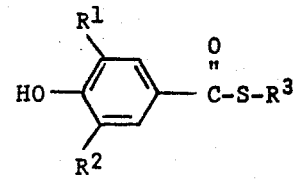

wherein $R^1$ is branched alkyl of 3 to 6 carbon atoms attached to the aromatic ring through a secondary or tertiary carbon atom, $R^2$ is branched alkyl of 3 to 6 carbon atoms attached to the aromatic ring through a secondary or tertiary carbon atom, and $R^3$ is benzyl.

2. The method of claim 1 wherein $R^1$ and $R^2$ are t-butyl.

3. A method for killing mosquitos which comprises contacting pre-adult mosquitos with a metamorphosis inhibiting amount of a compound represented by the formula

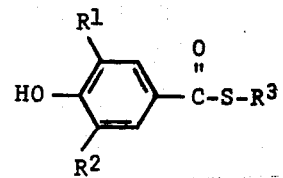

wherein $R^1$ is branched alkyl of 3 to 6 carbon atoms attached to the aromatic ring through a secondary or tertiary carbon atom, $R^2$ is branched alkyl of 3 to 6 carbon atoms attached to the aromatic ring through a secondary or tertiary carbon atom, and $R^3$ is t-alkyl of 4 to 6 carbon atoms.

4. The method of claim 3 wherein $R^1$, $R^2$ and $R^3$ are t-butyl.

5. The method of claim 4 wherein the pre-adult mosquitos are *Aedes aegypti* larvae.

6. A method for killing mosquitos which comprises contacting pre-adult mosquitos with a metamorphosis inhibiting amount of a compound represented by the formula

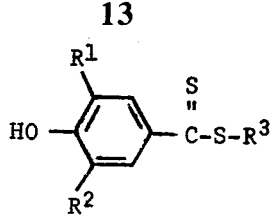

wherein R¹ is branched alkyl of 3 to 6 carbon atoms attached to the aromatic ring through a secondary or tertiary carbon atom, R² is branched alkyl of 3 to 6 carbon atoms attached to the aromatic ring through a secondary or tertiary carbon atom, and R³ is benzyl.

7. The method of claim 6 wherein R¹ and R² are t-butyl.

8. The method of claim 7 wherein the pre-adult mosquitos are *Aedes aegypti* larvae.

9. A method for killing mosquitos which comprises contacting pre-adult mosquitos with a metamorphosis inhibiting amount of a compound represented by the formula

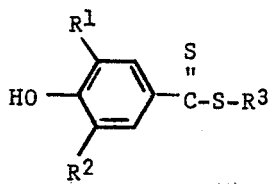

wherein R¹ is branched alkyl of 3 to 6 carbon atoms attached to the aromatic ring through a secondary or tertiary carbon atom, R² is branched alkyl of 3 to 6 carbon atoms attached to the aromatic ring through a secondary or tertiary carbon atom, and R³ is t-alkyl of 4 to 6 carbon atoms.

10. A method for killing mosquitos which comprises contacting pre-adult mosquitos with a metamorphosis inhibiting amount of a compound of the formula

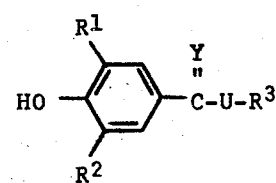

wherein Y is sulfur or oxygen, U is sulfur or oxygen, R¹ is branched alkyl of 3 to 6 carbon atoms attached to the aromatic ring through a secondary or tertiary carbon atom, R² is branched alkyl of 3 to 6 carobn atoms attached to the aromatic ring through a secondary or tertiary carbon atom, and R³ is 2-alkenyl of 3 to 6 carbons.

11. The method of claim 10 wherein Y is oxygen or sulfur and U is sulfur.

12. The method of claim 11 wherein Y is sulfur, R¹ and R² are t-butyl and R³ is allyl.

13. A method for killing mosquitos which comprises contacting pre-adult mosquitos with a metamorphosis inhibiting amount of a compound of the formula:

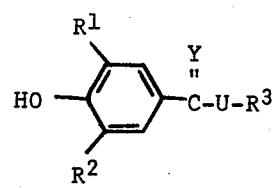

wherein Y is sulfur or oxygen, U is sulfur or oxygen, R¹ is branched alkyl of 3 to 6 carbon atoms attached to the aromatic ring through a secondary or tertiary carbon atom, R² is branched alkyl of 3 to 6 carbon atoms attached to the aromatic ring through a secondary or tertiary carbon atom, and R³ is 2-alkynyl of 3 to 6 carbon atoms.

14. The method of claim 13 wherein Y is sulfur, R¹ and R² are t-butyl and R³ is propargyl.

* * * * *